2,911,418

16-HALO 17-OXYGENATED ANDROST-5-EN-3-OLS AND ESTERS

William F. Johns, Morton Grove, and George P. Mueller, Park Ridge, Ill., assignors to G. D. Searle & Co., Chicago, Ill., a corporation of Delaware No Drawing. Application January 2, 1959
Serial No. 784,439

6 Claims. (Cl. 260—397.4)

This invention relates to 16-halo 17-oxygenated androst-5-en-3-ols, their esters, and processes for the manufacture thereof. More particularly, this invention relates to 16-chloro steroids of the formula

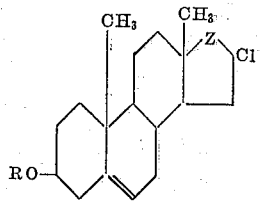

and 16-iodo steroids of the formula

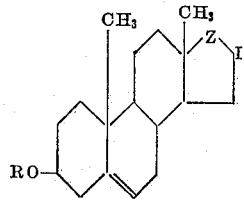

Z in each formula representing a carbonyl or hydroxymethylene radical and R in each formula representing hydrogen or a lower alkanoyl radical.

The lower alkanoyl radicals referred to are groupings of the formula

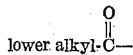

"lower alkyl" standing for methyl, ethyl, propyl, isopropyl, butyl, isobutyl, sec-butyl, tert-butyl, pentyl, isopentyl, tert-pentyl, neopentyl, hexyl, isohexyl, heptyl, or like $C_nH_{2n+1}$ monovalent aggregates wherein $n$ is a positive integer amounting to less than 9. Those skilled in the art will readily appreciate that when R in a foregoing formula represents a lower alkanoyl radical, the compounds comprehended are esters of the alcohols depicted when R represents hydrogen.

The compounds to which this invention relates are useful because of their valuable pharmacological properties. Thus, for example, they are anti-androgens, and as such capable of inhibiting the well-known effect of testosterone and its esters on secondary sex characteristics. Further, the subject compounds are progestins.

Manufacture of the 17-ketones hereof proceeds by contacting 3β,17-diacetoxyandrosta-5,16-diene with an appropriate halogen in an inert solvent medium. Where chlorine is the halogen, an antacid such as potassium carbonate is incorporated in the reaction mixture to destroy the hydrogen chloride produced. Where the halogenating agent is iodine, mercuric acetate is added to the reaction mixture. The 3-acetoxy-16α-halo ketones thus obtained are hydrolyzed to corresponding alcohols with dilute methanolic hydrogen chloride, or are reduced to the 3β,17β-diols hereof by contacting with lithium aluminum hydride in an inert solvent.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade and relative amounts of materials in parts by weight, except as otherwise noted.

Example 1

A. *3β-acetoxy-16α-chloroandrost-5-en-17-one.*—To a solution of 650 parts of 3β,17-diacetoxyandrosta-5,16-diene in 24,000 parts of carbon tetrachloride at 10° is added 1000 parts of anhydrous potassium carbonate. To the resultant mixture, during vigorous agitation, there is added over a 10-minute period a solution of 72 parts of chlorine in 2400 parts of carbon tetrachloride. Following the addition, an excess of aqueous sodium thiosulfate is introduced; and the reaction mixture is then extracted with chloroform. The chloroform extract is washed with water, dried over anhydrous sodium sulfate, and stripped of solvent by vacuum distillation. The semi-crystalline residue, further purified by recrystallization from acetone and from methanol, is 3β-acetoxy-16α-chloroandrost-5-en-17-one. The pure product melts at 188–190°.

B. *16α-chloro-3β-hydroxyandrost-5-en-17-one.*—A mixture of 7 parts of 3β-acetoxy-16α-chloroandrost-5-en-17-one in 1440 parts of methanol containing 48 parts of concentrated hydrochloric acid is maintained with agitation at room temperatures for 1 day. Solution occurs within a few hours. At the end of the prescribed reaction time, the solution is diluted with water, and the precipitate which forms is collected by filtration. Recrystallization from a mixture of acetone and petroleum ether affords 16α-chloro-3β-hydroxyandrost-5-en-17-one, melting at 178–180° and having a specific rotation of +1°. The product has the formula

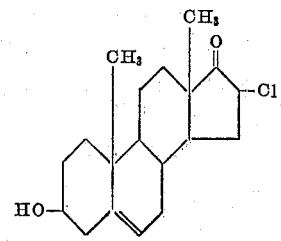

Example 2

*16α-chloroandrost-5-en-3β,17β-diol.*—To a slurry of 24 parts of lithium aluminum hydride in 710 parts of anhydrous ether is added with agitation over a 10-minute period a solution of 73 parts of 3β-acetoxy-16α-chloroandrost-5-en-17-one in 430 parts of anhydrous ether and 350 parts of tetrahydrofuran. After 5 minutes, the excess hydride is decomposed by cautious addition of water. Dilution with hydrochloric acid yields a solution which is extracted with ether. The extract is consecutively washed with water and aqueous sodium bicarbonate, then dried over anhydrous sodium sulfate, and finally stripped of solvent by vacuum distillation. Recrystallization of the residue from a mixture of acetone and petroleum ether affords the desired 16α-chloroandrost-5-en-3β,17β-diol, melting at 211–213°. The product is further characterized by a specific rotation of —88° and has the formula

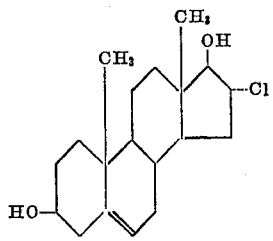

*Example 3*

A. *3β-acetoxy-16α-iodoandrost-5-en-17-one.*—To a solution of 220 parts of 3β,17-diacetoxyandrosta-5,16-diene in 10,000 parts of acetic acid containing 106 parts of mercuric acetate is added, during 1 hour, 150 parts of iodine dissolved in 10,000 parts of acetic acid. After a total of 2 hours, the reaction mixture is poured into water, and the insoluble material which precipitates is filtered out. This material is taken up in chloroform; and the chloroform extract is consecutively washed with aqueous potassium iodide, water, and aqueous sodium bicarbonate. The extract is then dried over anhydrous sodium sulfate and stripped of solvent by vacuum distillation. The residue, crystallized from a mixture of acetone and petroleum ether, affords pure 3β-acetoxy-16α-iodoandrost-5-en-17-one, melting at 183–185°.

B. *3β-hydroxy-16α-iodoandrost-5-en-17 - one.*—A mixture of 163 parts of 3β-acetoxy-16α-iodoandrost-5-en-17-one with 3200 parts of methanol containing 72 parts of concentrated hydrochloric acid is maintained with agitation at room temperatures for 20 hours. The mixture is then diluted with water and filtered. The insoluble matter thus separated is taken up in chloroform, and the chloroform extract is consecutively washed with aqueous sodium thiosulfate and aqueous potassium bicarbonate. The extract is then dried over anhydrous sodium sulfate and stripped of solvent by vacuum distillation. The residue, recrystallized from a mixture of acetone and petroleum ether, affords 3β-hydroxy-16α-iodoandrost-5-en-17-one, melting at 165–167° and with a specific rotation of —50°. The product has the formula

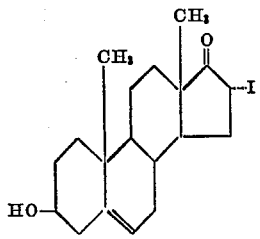

*Example 4*

*16α-iodoandrost-5-en-3β,17β-diol.*—To a slurry of 4 parts of lithium aluminum hydride in 560 parts of anhydrous ether at 0° is added, with agitation during 2 minutes, a solution of 10 parts of 3β-acetoxy-16α-iodoandrost-5-en-17-one in 710 parts of anhydrous ether. After an additional minute, water is carefully added, followed by an excess of hydrochloric acid. The resultant mixture is extracted with ether; and the ether extract is washed with aqueous sodium bicarbonate and then with water, dried over anhydrous sodium sulfate, and stripped of solvent by vacuum distillation. The crystalline residue is further purified by recrystallization from a mixture of dioxane and ethanol. The material thus isolated is the desired 16α-iodoandrost-5-en-3β,17β-diol, which melts at 233–235°. The product has the formula

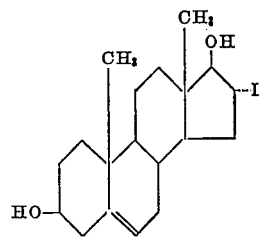

What is claimed is:
1. A compound of the formula

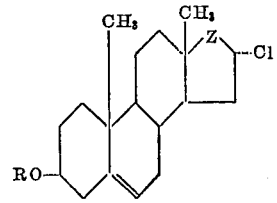

wherein Z is selected from the group consisting of carbonyl and β-(hydroxy)methylene radicals and R is selected from the group consisting of hydrogen and lower alkanoyl radicals.
2. 16α-chloro-3β-hydroxyandrost-5-en-17-one.
3. 16α-chloroandrost-5-en-3β,17β-diol.
4. A compound of the formula

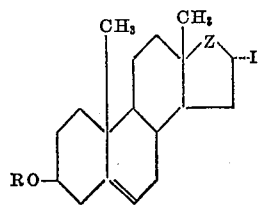

wherein Z is selected from the group consisting of carbonyl and β-(hydroxy)methylene radicals and R is selected from the group consisting of hydrogen and lower alkanoyl radicals.
5. 3β-hydroxy-16α-iodoandrost-5-en-17-one.
6. 16α-iodoandrost-5-en-3β,17β-diol.

No references cited.